Figure 1:
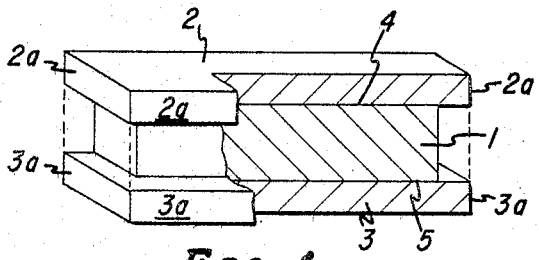
Figure 2:
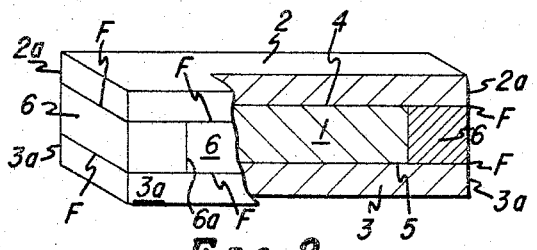
Figure 3:
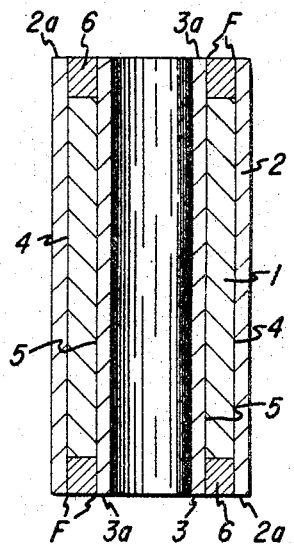
Figure 4:
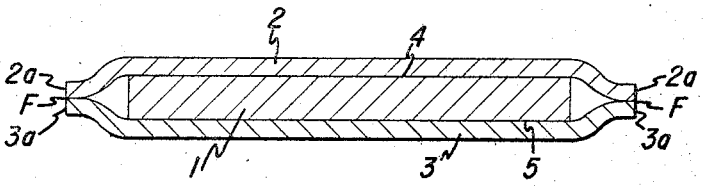

T 860,019

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MARCH 25, 1969

860 O.G. 1008

689,485

PREPARATION OF METAL COMPOSITES HAVING AN ENCAPSULATED INNER LAYER AND COMPOSITE METALS PRODUCED THEREBY

Sadun S. Tör, Summer Hill Drive, Phoenix, Md. 21131

Filed Dec. 11, 1967. Published Mar. 25, 1969

Class 29—194

1 Sheet Drawing. 11 Pages Specification

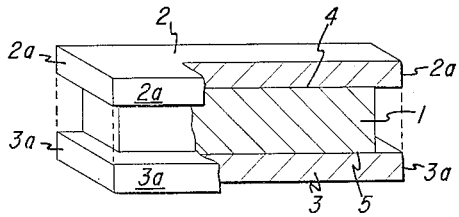

Three-layered products, preferably planar or tubular, which are useful as electrodes in corrosive electrolytes, comprise like outer layers of titanium, zirconium, tantalum or niobium, and an inner layer of copper, aluminum or iron that is bonded to each outer layer over substantially their entire interface by a metallurgical bond consisting essentially of direct outer layer-to-inner layer (explosion) bond and is encapsulated (to the extent required to protect it from corrosion) between overlapping portions of the outer layers by a continuous metallurgical seal that is of the same composition as the outer layers and bridges their overlapping portions. Products such as titanium/copper/titanium having a completely encapsulated copper layer are particularly useful as electrodes in electrolytic copper refining and chlorine reduction cells. The above products are prepared from three-layered explosion-bonded composites by selectively removing metal from the exposed surface(s) of the inner layer, e.g., by machining or chemical etching, thereby recessing the inner layer between overalpping portions of the outer layers, and then fusion bonding, e.g., by "TIG" welding, the overlapping portions directly to each other or to a like metal insert that has been positioned in the recess between the overlapping portions.

T860,019

SN - 689485

March 25, 1969 S. S. TÖR DEF. PUB.

PREPARATION OF METAL COMPOSITES HAVING AN ENCAPSULATED INNER LAYER AND COMPOSITE METALS PRODUCED THEREBY

Filed Dec. 11, 1967

INVENTOR.
SADUN S. TÖR